July 22, 1969 L. H. TOMLINSON 3,457,121

THERMAL GENERATOR AND FLAMEHOLDER

Filed April 22, 1965 2 Sheets-Sheet 1

Inventor:
Lee H. Tomlinson,
by Paul A. Frank
His Attorney.

THERMAL GENERATOR AND FLAMEHOLDER

Filed April 22, 1965 2 Sheets-Sheet 2

Inventor:
Lee H. Tomlinson,
by Paul A. Frank
His Attorney.

United States Patent Office 3,457,121
Patented July 22, 1969

3,457,121

THERMAL GENERATOR AND FLAMEHOLDER

Lee H. Tomlinson, Schenectady, N.Y., assignor to General Electric Company, a corporation of New York Filed Apr. 22, 1965, Ser. No. 450,145
Int. Cl. H01v 1/30
U.S. Cl. 136—208 10 Claims

ABSTRACT OF THE DISCLOSURE

A thermoelectric generator is formed by a plurality of thermoelectric elements mounted on the exterior of a housing. A burner assembly is releasably fitted to the housing including a central plenum forming a passage extending between a source of combustible materials and the housing. An exhaust duct communicates with the passage between the source and the housing. A transverse wall is mounted in the passage between the duct and source and a plurality of laterally spaced tubes cooperate with the wall to deliver the combustible materials into the housing while permitting indirect heat transfer with combustion products leaving the housing. A combustion distributor and heat transfer elements are located within the housing to improve heat transfer.

My invention relates to a thermoelectric generator.

It is known that when direct electric current is passed through a series of junctions between elements alternately formed of two materials having dissimilar thermoelectric properties, certain of the junctions will absorb heat and the other junctions will release heat. The phenomenon is generally referred to as the Peltier effect. A reverse effect, known as the Seebeck effect, can also be achieved by heating certain junctions and cooling other junctions to produce a flow of electric current through the series of junctions.

It has recently been suggested to utilize the Seebeck effect to provide fuel-fired portable generating units utilizing direct conversion of heat to electricity. Such thermoelectric generators offer distinct advantages over conventional portable electrical generating units such as motor-generator sets and batteries. Motor-generator sets are relatively heavy and require vehicle transportation for use in remote areas. Battery units have the disadvantage of limited life. Further, in arctic type environments motor-generator sets are difficult to place in operation while battery units offer only a fraction of the electrical capacity exhibited at normal temperature levels. By contrast, thermoelectric generators may be made hand portable and are capable of reliable and enhanced performance at reduced temperatures.

One of the outstanding disadvantages of thermoelectric generators has been the low efficiency of such units in converting available thermal energy to electricity. It is generally acknowledged that thermoelectric generators are capable of converting less than ten percent of the heat energy available through temperature differentials in the electrical circuitry to electrical energy.

It is an object of my invention to provide a thermoelectric generator exhibiting a more efficient conversion of heat energy to electrical energy.

It is another object to provide an improved burner assembly for a thermoelectric generator.

It is a further object to provide a thermoelectric generator capable of removing energy from combustion products.

These and other objects of my invention are accomplished by providing a thermoelectric generator formed of a burner assembly and a generator assembly. The generator assembly includes a housing and thermoelectric generating means mounted exteriorly of said housing. The burner assembly is connected to the generator assembly and includes a counter-current, indirect heat exchanger capable of guiding a combustible mixture into said housing and of guiding combustion products from said housing in indirect heat transfer relationship with said combustible mixture.

My invention may be better understood by reference to the following detailed description taken in conjunction with the drawings, in which.

Figure 1:
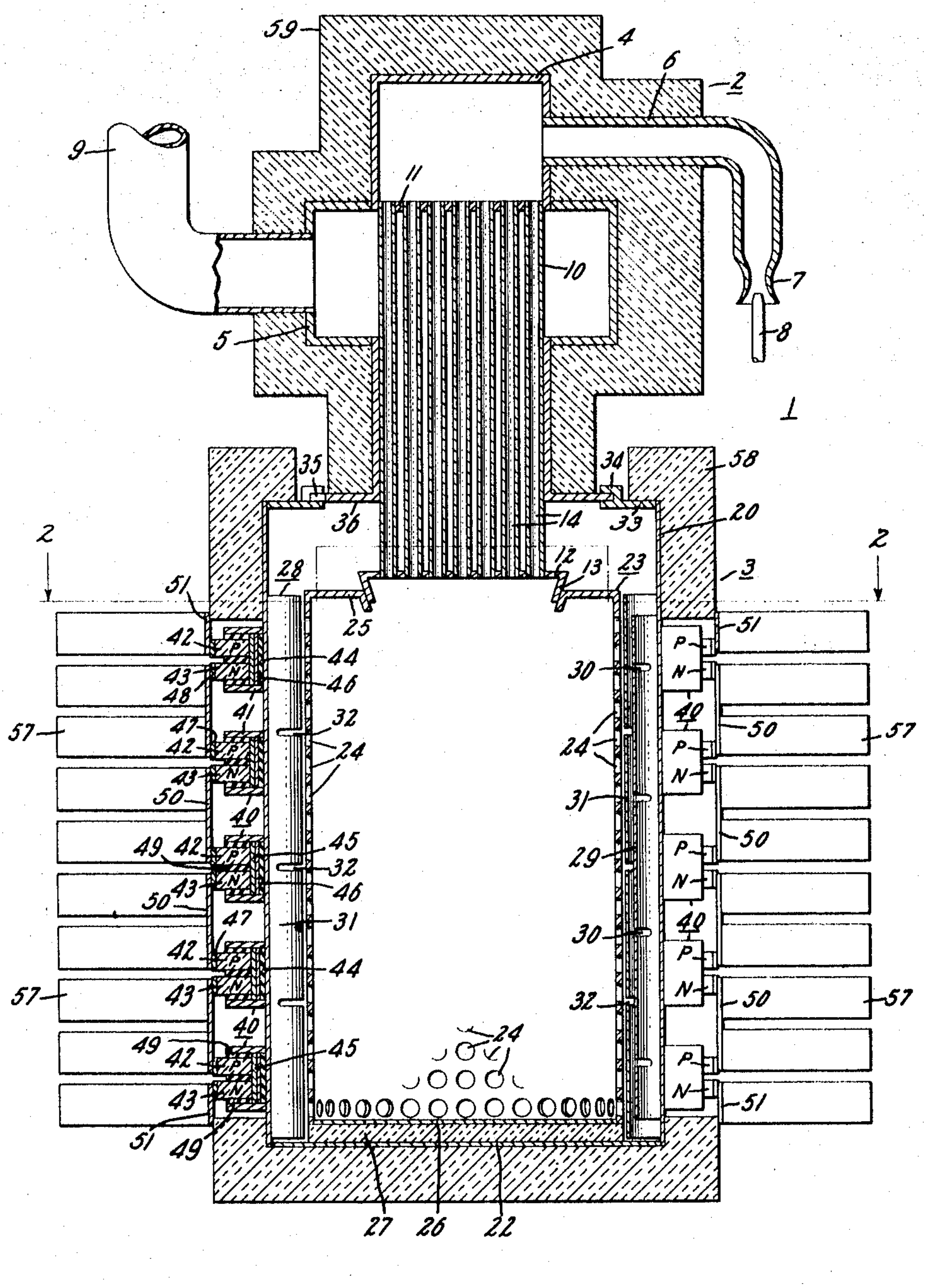
FIGURE 1 is a vertical section taken along line 1—1 in FIGURE 2.

The thermoelectric generator 1 shown in FIGURE 1 is comprised of a burner assembly 2 and a generator assembly 3. The burner assembly is formed of a central plenum 4 having a central portion 5 of enlarged diameter. The central plenum is provided with a fuel-oxidant supply conduit 6 rearwardly of the enlarged diameter portion. The supply conduit terminates exteriorly of the central plenum in a venturi aspirator 7. Fuel is supplied to the aspirator through tube 8. An exhaust duct 9 is connected to the enlarged diameter portion of the central plenum.

Mounted within the central plenum is a regenerator-flameholder 10 formed of a rear wall 11 separating the rear portion of the central plenum from the enlarged diameter portion. A forward wall 12 is provided with a tapered flange 13 to cooperate with the generator assembly 3. A plurality of heat transfer tubes 14 extend through the rear wall 11 and the forward wall 12.

Figure 2:
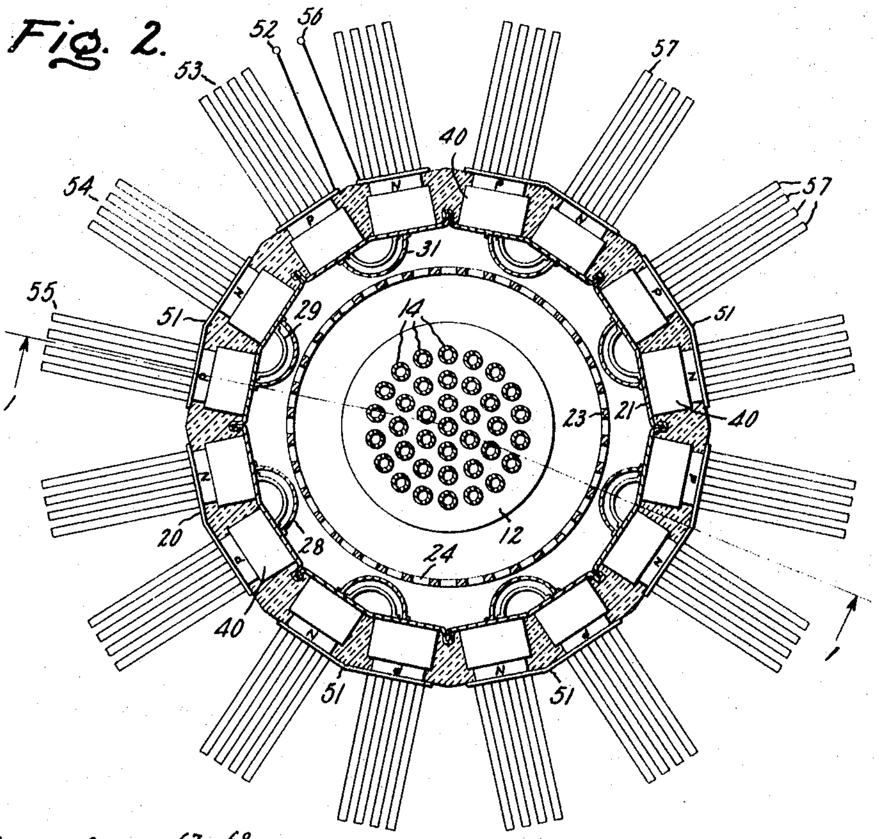
FIGURE 2 is a cross section taken along line 2—2 in FIGURE 1.

The generator assembly 3 includes a housing 20 formed of eight edge interlocked sheets 21 (note FIGURE 2). A lower wall 22 is fitted within the edge interlocked sheets and forms a portion of the housing. Concentrically mounted within the housing is combustion product distributor 23 provided with a plurality of uniformly spaced apertures 24. The upper end of the distributor is provided with a flange 25 which cooperates with tapered flange 13 of the flameholder. At its lower end, the distributor is provided with an imperforate wall 26. The distributor is held in position within the housing wedged between the tapered flange 13 and a thermal insulating disk 27.

Eight rows of heat transfer units 28 are mounted within the housing between the distributor and the edge interlocked sheets 21. The heat transfer units shown are generally similar to those shown in FIGURE 2 of my earlier application Ser. No. 332,489, filed Dec. 23, 1963, now Patent No. 3,224,504, and commonly assigned. Each heat transfer unit is formed of an inner cylinder segment 29 having longitudinally spaced slots 30 therein. An outer cylinder segment 31 is positioned concentrically with the inner cylinder segment 29 and is similarly provided with slots 32. The slots 32 occur in the outer segment 31 so as to be equidistantly spaced between the slots 30 in each inner cylinder segment.

The housing is provided at its upper end with a flange 33. The interior lip of the flange is provided with a female bayonet joint connector 34. The burner assembly is provided with a cooperating male bayonet connector 35 mounted on the exterior lip of a forward face flange 36 connected to the central plenum.

A plurality of thermoelectric cartridges 40 are mounted on the exterior of the housing. Each cartridge is formed of a cylindrical shell 41 containing two semiconductor thermoelectric elements 42 and 43. As shown, elements 42 are N-type and elements 43 are P-type. Thermoelectric materials are classified as either N-type or P-type depending upon the direction of current flow across the junction formed by the thermoelectric material and another material when operating as a thermoelectric generator according to the Seebeck effect. If the positive current direction at the cold junction is from the thermoelectric material then it is termed a P-type thermoelectric material. Conversely, if the positive current direction is from the cold junction and toward the thermoelectric material, it is termed an N-type thermoelectric material.

Within the cartridge shell is provided an electrically insulative, thermally conductive disk 44 formed of a material such as aluminum oxide. Mounted at the end of the thermoelectric elements 42 and 43 adjacent the housing is a diffusion barrier disk 45. Between the diffusion barrier 45 and the electrically insulative disk 44 is mounted a disk 46 formed of a material such as silver to compensate for the differential in expansion coefficients of the electrically insulative disk and the diffusion barrier. Diffusion barriers 47 and 48 are mounted adjacent the P-type and N-type thermoelectric elements respectively at the ends remote from the housing.

The diffusion barriers 45, 47, and 48 perform the dual function of serving as junction means electrically connecting the semiconductive thermoelectric elements and of preventing molecules of adjacent materials from contaminating the thermoelectric materials. For example, if the thermoelectric elements were formed of lead telluride, which is a very effective and efficient thermoelectric material, the attachment of copper circuitry directly to thermoelectric elements would poison the elements and render them ineffective. On the other hand, replacement of copper circuitry with iron or the interposition of iron disks between copper and lead telluride will prevent poisoning.

Mounted between adjacent thermoelectric elements in each shell and between each thermoelectric element and the shell is an electrically insulative layer 49 such as asbestos, mica, etc., which is capable of allowing lateral thermal expansion of the thermoelectric elements.

The thermoelectric cartridges 40 are arranged on the exterior of the housing 20 in sixteen vertical rows and five horizontal tiers. Straps 50 connect opposite type thermoelectric elements in adjacent cartridges within each vertical row as illustrated in FIGURE 1. As illustrated in FIGURE 2, straps 51 connect every other adjacent pair of cartridges in the top and bottom horizontal rows. Electrical terminal 52, for example, is connected to the top cartridge in vertical row 53. The top cartridge is connected to the bottom cartridge in row 53 in the manner illustrated in FIGURE 2. The bottom cartridge in row 53 is connected to the bottom cartridge in row 54 through a strap 51, not shown. The top cartridge in row 54 is connected to the top cartridge in row 55 through strap 51. The remaining rows of cartridges are connected in series in like manner. Electrical terminal 56 is separated electrically from terminal 52 by the electrical potential of eighty thermoelectric cartridges or one hundred sixty thermoelectric elements connected in series.

Extending perpendicularly from the exterior surfaces of the straps 50 and 51 are heat dissipation fins 57. A body of thermal insulation 58 is provided adjacent the exterior surface of the housing; a similar layer of thermal insulation 59 is provided adjacent the exterior surface of the burner assembly.

Figure 4:
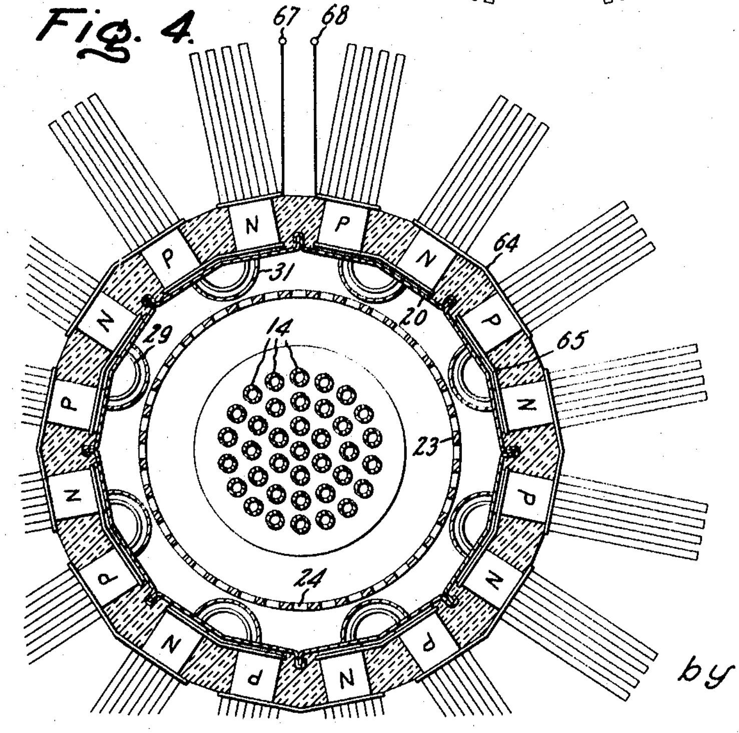
FIGURE 4 is a cross section similar to FIGURE 2 of a modified form of thermoelectric generator.
Figure 3:
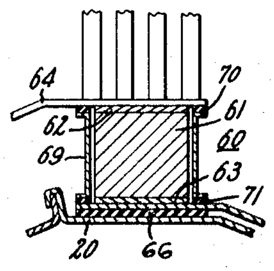
FIGURE 3 is a detail of a thermoelectric cartridge.

An alternate thermoelectric cartridge arrangement is illustrated in FIGURES 3 and 4. A thermoelectric cartridge 60 is shown in FIGURE 3, including a thermoelectric element 61 formed of a semiconducting material such as lead telluride of either the P-type or N-type. Diffusion barriers 62 and 63 are provided at opposed ends of the thermoelectric element. The diffusion barrier 62 is in electrical contact with a connecting strap 64 remote from housing 20 while diffusion barrier 63 is in contact with strap 65. A thermally conductive, electrically insulative layer 66 separates the strap 65 from housing 20. Each cartridge is equipped with a shell 69 spaced from the thermoelectric element and diffusion barriers. The shell is thermally and electrically insulated from the straps by O-rings 70 and 71. As illustrated in FIGURE 4, each horizontal tier of thermoelectric cartridges is connected in series and provided with terminals such as 67 and 68. Adjacent horizontal tiers of cartridges may be connected in series or parallel as desired.

In operation, the thermoelectric generator 1 shown in FIGURES 1 and 2 is placed in operation by disconnecting the burner assembly 2 from the generator assembly 3. Fuel is supplied to the burner assembly through tube 8 and is mixed with air in venturi aspirator 7. The mixed fuel and air stream enters the central plenum 4 through supply conduit 6.

The fuel-air mixture is prevented from entering the enlarged diameter portion 5 of the central plenum by the rear wall 11 of regenerator-flameholder 10, and the fuel-air mixture passes through the heat transfer tubes 14. Since the total cross-sectional flow area of the heat transfer tubes is less than that of the central plenum, the fuel-air mixture flows at a higher velocity through the tubes than through the plenum. The increased velocity through the tubes minimizes any tendency of flame to travel toward the fuel-air source thereby producing a flashback.

The fuel-air mixture issuing from the tubes 14 is ignited adjacent the forward wall 12. When the flame is well stabilized and the various components are well heated, the burner assembly is again connected to the generator assembly by means of female and male bayonet connectors 34 and 35.

The flame propagated by the burner assembly is confined within the combustion product distributor 23. The combustion products issue radially from the flame zone through the apertures 24 in the combustion product distributor. The hot combustion products then impinge the heat transfer units 28. The hot gases first impinge the outer cylinder segments 31 and are deflected through slots 32. The stream of gas passing through each slot 32 is divided upon impact with inner cylinder segment 29. Half of the stream is deflected toward each of two adjacent slots 30. Upon passage through the slots 30, the combustion products impinge the house 20 directly and are deflected upwardly in contact with the housing through the interior of the inner cylinder segment.

The combustion products exit from the top of housing through the burner assembly. The gases pass through the spaces between tubes 14 in central plenum 4. Accordingly, any residual heat in the combustion products not transferred to the housing is transferred to the tubes 14 and to the relatively cold entering fuel-air mixture. The combustion products remain in contact with the tubes 14 and in indirect thermal contact with the fuel-air mixture until reaching the enlarged diameter portion 5 of the central plenum 4. The combustion products are exhausted from the burner assembly through the duct 9. The additional heat energy added to the fuel-air mixture by the exhausting combustion products adds to the temperature within the flame zone attainable with a given fuel-air mixture and flow rate. Accordingly, it is apparent that less fuel is required to obtain equivalent temperatures within the generator unit than would be required absent indirect thermal contact between the combustion products and fuel-air mixture.

The electrical output of each thermoelectric element is directly related to the temperature differential between the hot junction and the cold junction. In cartridges 40, the diffusion barrier disk 45 forms a hot junction with each of the thermoelectric elements 42 and 43. The cold junctions are formed by diffusion barriers 47 and 48 and straps 50 and 51. The heat energy released within the housing by the burner flame is conducted to the hot junctions through thermally conductive, electrically insulative disks 44 and expansion equalizing disks 46. Dissipation of heat from the housing other than through the heat conductive disks is minimized by use of thermal insulation 58. At the same time, a low temperature at the cold junction is assured by heat dissipation fins 57. As previously noted, the P-type and N-type thermoelectric elements direct current in opposite directions at each of the hot and cold junctions. By connecting the P-type and N-type thermoelectric elements in series, a series electrical circuit is formed.

The operation of the thermoelectric generator shown in FIGURES 3 and 4 differs from thermoelectric generator 1 only in electrical characteristics. Since there are only half as many thermoelectric elements in the modified thermoelectric generator, a lower potential is generated between the terminals 67 and 68. On the other hand, each individual thermoelectric element is larger imparting a greater current output. The current output may be further enhanced by connecting adjacent horizontal tiers of cartridges in parallel.

It is appreciated that numerous modifications may be made in the thermoelectric generators disclosed without departing from the teaching of the invention. For example, any known type of thermoelectric cartridge may be substituted for the cartridges 40 and 60 disclosed. Suitable thermoelectric cartridges are disclosed in commonly assigned application Ser. No. 268,953, filed Mar. 29, 1963, now Patent No. 3,351,498. Numerous thermoelectric materials suitable for the formation of thermoelectric elements are known to the art. Numerous diffusion barrier materials, thermally conductive-electrically insulative materials, and thermally insulative materials are also known to the art. It is appreciated that the diffusion barriers may be omitted if the electrically conductive elements adjacent the thermoelectric elements are formed of materials which have no tendency to poison the thermoelectric materials. The electrical connection of adjacent thermoelectric cartridges in parallel or series-parallel combinations rather than in series as shown is considered to be within the ordinary skill of the art. The position, number, and arrangement of thermoelectric cartridges is, of course, immaterial to the practice of the invention.

The heat dissipation fins 57 may take any convenient configuration or arrangement. It may be desired to enhance heat dissipation by fitting the thermoelectric generator as a whole into a duct through which a coolant is forced. If a portable unit is desired, the thermoelectric generator may be mounted in a duct positioned within an annular fuel container. Such constructions are generally old as indicated by Meyers Patent No. 3,056,848.

The heat transfer units 28 may take any form disclosed in my previously cited earlier filed application. Alternately, any conventional form of heat collecting protuberances may be employed. It is contemplated that the heat transfer units 28 may be omitted entirely and the impingement of the combustion products with the housing relied upon entirely for heat transfer, although such an arrangement would be less efficient than that disclosed. The combustion product distributor 23 may, if desired, be omitted or modified in configuration. The apertures 24 may be arranged so as to allow distribution of combustion products only in selected relationship to the heat transfer units 28. It is appreciated that the housing and distributor need not be of cylindrical configuration as shown but may be spherical or hemispherical.

The burner assembly need not be connected to the generator assembly by a bayonet coupling but may be attached by any releasable connection. It is not necessary that the burner assembly be entirely releasable from the generator assembly but only that sufficient gap be provided between flanges 33 and 36 for a spark to be introduced into the area in front of forward wall 12. If desired, the distributor 23 could be anchored to the housing and the coupling with the burner assembly provided between the distributor and the burner assembly rather than between the housing and burner assembly as shown. If a spark generating apparatus is mounted within the housing, such as a conventional spark plug, the burner assembly may be formed integrally with the generator assembly.

The heat transfer tubes in the flameholder need not be arranged in the configuration shown but may be arranged in any convenient configuration. Although the arrangement shown and described is preferred and considered most efficient, it is not necessary to pass the fuel-air mixture through the tubes 14 while the combustion products are passed throuhg the space between tubes. Both gas streams may be passed through tubes, or the fuel-air mixture may be passed through the spaces between tubes while the combustion products are passed through tubes. Finally, in order to improve heat transfer to the tubes, it may be desired to provide heat transfer protuberances such as fins.

From the foregoing, it is apparent that the specific embodiments shown are only illustrative and are more limited than my invention. It is accordingly intended that the scope of my invention be determined with reference to the following claims.

What I claim as new and desired to secure by Letters Patent of the United States is:

1. A thermoelectric generator comprising
   a generator assembly including a housing and thermoelectric generating means mounted exteriorly of said housing and
   a burner assembly connected to said generator assembly including means forming a passage within said burner assembly communicating with said housing, supply means capable of delivering a combustible mixture to a portion of said passage remote from said housing, exhaust means communicating with said passage mediate said housing and said supply means, and a flameholder mounted within said passage including
      a transverse wall mounted in said passage between said exhaust means and said supply means, and
      laterally spaced tubular partition means within said passage cooperating with said wall and extending between said wall and said housing for guiding said combustible mixture through said passage free from direct contact with combustion products conveyed from said housing to said exhaust means through said passage.

2. A thermoelectric generator according to claim 1 additionally including means capable of dissipating heat from the portion of said thermoelectric generating means remote from said housing.

3. A thermoelectric generator according to claim 1 additionally including thermal insulation protecting the exterior of said housing and said burner assembly from heat loss.

4. A thermoelectric generator according to claim 1 in which the burner assembly is provided with a releasable connection to the housing.

5. A thermoelectric generator comprising
   a generator assembly including a housing, a plurality of heat transfer units mounted in spaced relation adjacent the interior surface of said housing, each of said heat transfer units including an inner cylinder segment having longitudinally spaced inner slots and an outer cylinder segment having outer slots longitudinally spaced mediate said inner slots, and thermoelectric generating means mounted exteriorly of said housing, and
   a burner assembly connected to said generator assembly including means forming a passage within said burner assembly communicating with said housing, supply means capable of delivering a combustible mixture to a portion of said passage remote from said housing, exhaust means communicating with said passage mediate said housing and said supply means, and a flameholder mounted within said passage including
- a wall mounted in said passage between said exhaust means and said supply means, and
- partition means within said passage between said wall and said housing capable of guiding said combustible mixture through said passage free from direct contact with combustion products conveyed from said housing to said exhaust means through said passage.

6. A thermoelectric generator comprising
- a generator assembly including a housing, a perforate combustion distributor means located within said housing, and a thermoelectric generating means mounted exteriorly of said housing, and
- a burner assembly connected to said generator assembly including
  - a central plenum forming a passage communicating with said housing,
  - a combustible mixture supply conduit connected to said plenum remote from said housing,
  - an exhaust duct connected to said plenum mediate said supply conduit and said housing, and
  - a regenerator-flameholder mounted within said plenum and extending into said housing including
    - a transverse wall mediate said exhaust duct and said supply conduit,
    - a plurality of heat transfer tubes mounted in said wall and extending into said housing, and
    - means for positioning said regenerator-flameholder in engagement with said combustion distributor means.

7. A thermoelectric generator according to claim 6 additionally including means capable of dissipating heat from the portion of said thermoelectric generating means remote from said housing.

8. A thermoelectric generator according to claim 6 additionally including thermal insulation protecting the exterior of said housing and said burner assembly from heat loss.

9. A thermoelectric generator according to claim 6 in which the burner assembly is provided with a releasable connection to the housing.

10. A thermoelectric generator comprising
- a generator assembly including a housing, a plurality of heat transfer units mounted in spaced relation adjacent the interior surface of said housing, each of said heat transfer units including an inner cylinder segment having longitudinally spaced inner slots and a outer cylinder segment having outer segments longitudinally spaced mediate said inner slots, and thermoelectric generating means mounted exteriorly of said housing, and
- a burner assembly connected to said generator assembly including
  - a central plenum forming a passage communicating with said housing,
  - a combustible mixture supply conduit connected to said plenum remote from said housing,
  - an exhaust duct connected to said plenum mediate said supply conduit and said housing, and
  - a regenerator-flameholder mounted within said plenum and extending into said housing including
    - a wall mediate said exhaust duct and said supply conduit, and
    - a plurality of heat transfer tubes mounted in said wall and extending into said housing.

References Cited

UNITED STATES PATENTS

| | | | |
|---|---|---|---|
| 808,086 | 12/1905 | Heil | 136—208 |
| 1,724,783 | 8/1929 | Smallwood et al. | 263—20 X |
| 2,480,404 | 8/1949 | Findley et al. | 136—212 |

ALLEN B. CURTIS, Primary Examiner

U.S. Cl. X.R.

158—7.5; 263—20